(12) United States Patent
Hickey et al.

(10) Patent No.: US 7,050,767 B2
(45) Date of Patent: May 23, 2006

(54) MOBILE COMPUTING DEVICES HAVING ROTATIONALLY EXPOSED USER INTERFACE DEVICES

(75) Inventors: Kurt M. Hickey, Durham, NC (US); Hans F. Eckholm, Raleigh, NC (US)

(73) Assignee: Sony Ericsson Mobile Communications, AB, (SE)

( * ) Notice: Subject to any disclaimer, the term of this patent is extended or adjusted under 35 U.S.C. 154(b) by 273 days.

(21) Appl. No.: 10/615,474

(22) Filed: Jul. 7, 2003

(65) Prior Publication Data

US 2005/0009556 A1    Jan. 13, 2005

(51) Int. Cl.
*H04B 1/38* (2006.01)
*H04M 1/00* (2006.01)
*H04M 9/00* (2006.01)

(52) U.S. Cl. .................. 455/90.3; 455/556.2; 455/566; 455/575.3; 379/433.13; D14/138; D28/77

(58) Field of Classification Search ............. 455/550.1, 455/566, 575.1, 575.3, 90.3, 556.2, 575.6; D14/138; 379/433.13; 361/680; 341/22; D28/77
See application file for complete search history.

(56) References Cited

U.S. PATENT DOCUMENTS

| | | | | |
|---|---|---|---|---|
| 5,337,346 A | * | 8/1994 | Uchikura | 455/556.2 |
| 5,485,517 A | * | 1/1996 | Gray | 379/433.13 |
| 5,692,046 A | * | 11/1997 | Jambhekar | 379/433.13 |
| 5,898,774 A | * | 4/1999 | Shindo | 379/433.13 |
| D470,627 S | * | 2/2003 | Kuo | D28/77 |
| 6,766,182 B1 | * | 7/2004 | Janninck et al. | 455/575.3 |
| 6,768,899 B1 | * | 7/2004 | Janninck et al. | 455/566 |
| D501,838 S | * | 2/2005 | Kim et al. | D14/138 |
| 6,856,792 B1 | * | 2/2005 | Harmon | 455/90.3 |
| D502,932 S | * | 3/2005 | Minamide | D14/138 |
| 2002/0050981 A1 | | 5/2002 | Nuovo | 345/169 |
| 2003/0017810 A1 | | 1/2003 | Janninck et al. | 455/575.1 |
| 2003/0119569 A1 | | 6/2003 | Reed | 455/575.7 |
| 2004/0224729 A1 | * | 11/2004 | Watanabe et al. | 455/575.3 |

FOREIGN PATENT DOCUMENTS

| | | | |
|---|---|---|---|
| DE | 3323858 | * | 1/1985 |
| DE | 4108169 | * | 9/1991 |
| JP | 2002057771 | | 2/2002 |
| WO | WO 03050665 | | 6/2003 |

OTHER PUBLICATIONS

International Search Report; PCT/IB2004/000092; Jan. 28, 2005.

* cited by examiner

*Primary Examiner*—William D. Cumming
(74) *Attorney, Agent, or Firm*—Myers Bigel Sibley & Sajovec, PA

(57) ABSTRACT

A mobile computing device includes a first housing that is rotationally coupled to a second housing, computing circuitry within the first housing and a display that is at least partially disposed within the first housing. The display is configured to visually display information from the computing circuitry to a user. A first user interface device and a second user interface device are at least partially disposed within the second housing. The second housing is configured to be rotated relative to the first housing between a closed position in which the first and second user interface devices are at least partially covered by the first housing, and a deployed position in which the first and second user interface devices are at least partially uncovered on opposite lateral sides of the first housing.

14 Claims, 6 Drawing Sheets

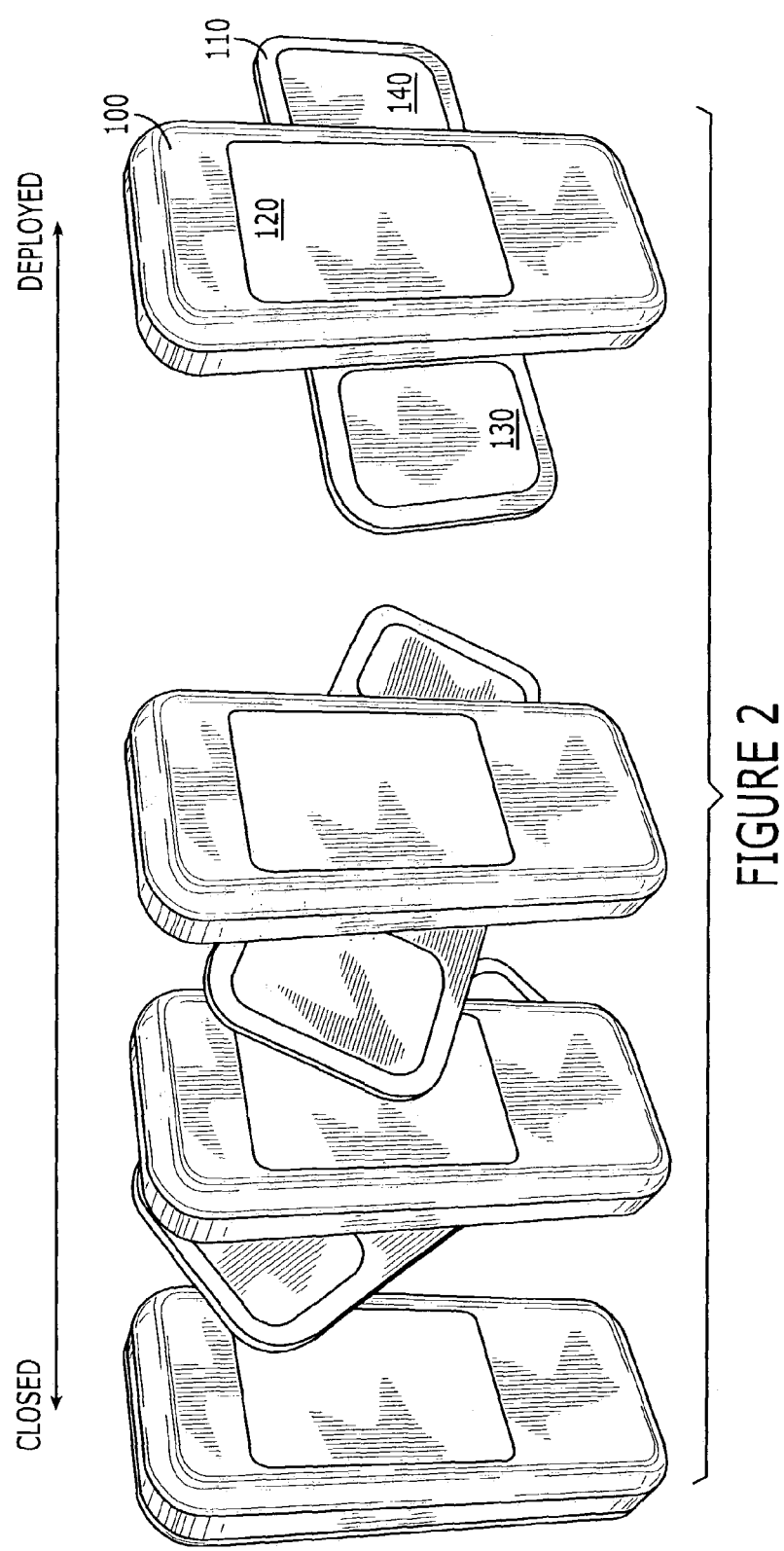

MOBILE COMPUTING DEVICES HAVING ROTATIONALLY EXPOSED USER INTERFACE DEVICES

BACKGROUND OF THE INVENTION

1. Technical Field

The present invention relates to mobile computing devices and more particularly, to mobile computing devices having movable user interface devices.

2. Description of the Related Art

The ability to integrate an increasing amount of functionality into a smaller electronics sometimes doesn't result in a smaller product size. Instead, the size of the product may be limited by its user interface and a need to provide an efficient aesthetic interface for a user to access and use the product functionality. For example, wireless mobile terminals sometimes provide a limited number of keys that can be comfortably manipulated with fingers, and which can have different functional purposes depending upon different functional modes of the terminal. As more functionality, such as games, internet, video, and music, is integrated into mobile terminals, the user interface may need to provide more keys, controls, or other interface devices having increased multi-functional capabilities. However, providing more keys or controls may not be acceptable due to a desire for the product to have small size and/or a desire to reduce the complexity of the interface to a user.

SUMMARY OF THE INVENTION

Embodiments of the present invention provide a mobile computing device that includes a first housing that is rotationally coupled to a second housing. Computing circuitry is within the first housing and a display is at least partially disposed within the first housing. The display is configured to visually display information from the computing circuitry to a user. A first user interface device and a second user interface device are at least partially disposed within the second housing. The second housing is configured to be rotated relative to the first housing between a closed position, in which the first and second user interface devices are at least partially covered by the first housing, and a deployed position, in which the first and second user interface devices are at least partially uncovered on opposite lateral sides of the first housing.

In other embodiments of the present invention, at least one of the user interface devices is enabled when the second housing is in the deployed position and is disabled when the second housing is in the closed position. In still other embodiments, the computing circuitry is configured to operate in a first mode when the second housing is in the deployed position and to operate in a second mode when the second housing is in the closed position.

The deployable user interface devices may provide an improved interface for a user, may allow a mobile computing device to be reduced in size, and/or may provide an expanded user interface to support more functionality in a mobile computing device.

BRIEF DESCRIPTION OF THE DRAWINGS

FIG. 2 illustrates deployment of user interface devices in the mobile computing device of FIG. 1 in accordance with various embodiments of the present invention.

DETAILED DESCRIPTION

Figure 1:
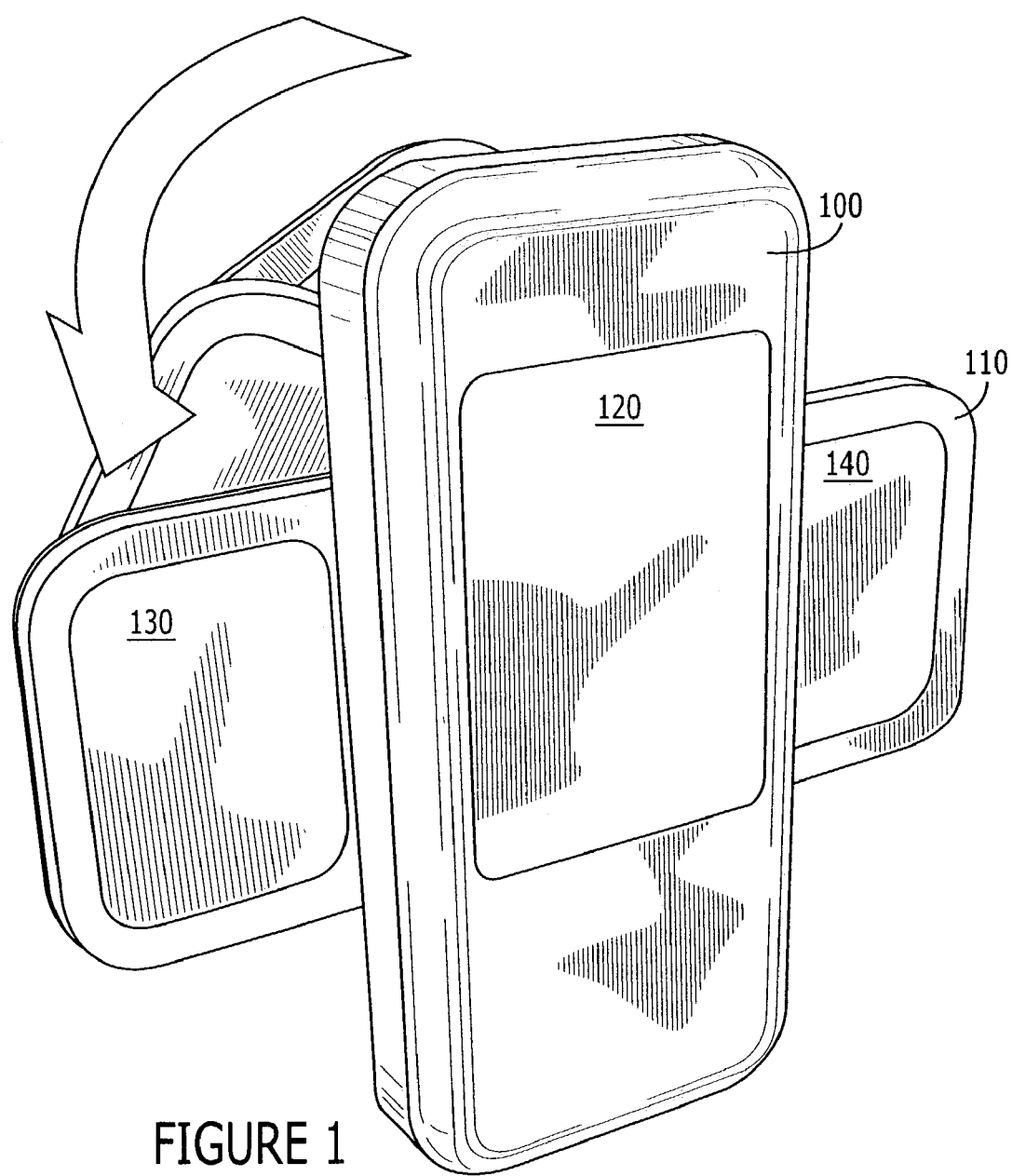
FIG. 1 illustrates a mobile computing device in accordance with various embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It should be further understood that the terms "comprises" and/or "comprising" when used in this specification is taken to specify the presence of stated features, steps, operations, elements, and/or components, but does not preclude the presence or addition of one or more other features, integers, steps, operations, elements, components, and/or groups thereof.

The present invention may be embodied as circuits and/or computer program products. Accordingly, the present invention may be embodied in hardware and/or in software (including firmware, resident software, micro-code, etc.).

The present invention is described herein in the context of mobile computing devices, including mobile terminals, however it will be understood that invention may be embodied in other types of mobile computing devices, including, for example a satellite or cellular radiotelephone with or without a multi-line display; a Personal Communications System (PCS) terminal that may combine a cellular radio-telephone with data processing, facsimile and data communications capabilities; a PDA, a pager, a Web browser, an organizer, a global positioning system (GPS) receiver; a laptop and/or palmtop device; a mobile game device or other mobile device that performs data processing.

Referring now to FIG. 1, an exemplary mobile computing device, in accordance with various embodiments of the present invention, includes a main housing 100 and a deployable interface housing 110. The main housing 100 can include a display 120 that is configured to visually display information to a user, and can enclose computing circuitry that is coupled to the display 120 to provide user functionality. The interface housing 110 can include one or more user interface devices including, for example, a speaker, keyboard, and/or a touch sensitive pad (touchpad) that are at least partially disposed within the interface housing 110. As shown in FIG. 1, the interface housing 110 includes two user interface devices 130 and 140. The interface devices 130 and 140 may be releaseably connected to the interface housing 110. The main housing 100 may also include one or more user interfaces devices in addition to the display 120.

The interface housing 110 is rotationally coupled to the main housing 100 so that it can be rotated relative thereto between a closed position and a deployed position. FIG. 2 illustrates the interface housing 110 in various example stages between the closed position and the deployed position. In the closed position, the interface devices 130 and 140 are at least partially covered by the main housing 100, and in the deployed position, the interface devices 130 and 140 are at least partially uncovered on opposite lateral sides of the main housing 110. As illustrated in FIG. 2, for example, an entire front surface of the interface devices 130 and 140 may be covered by the main housing 100 when the interface housing 110 is in the closed position, and/or the entire front surface of the interface devices 130 and 140 may be uncovered when the interface housing 110 is in the deployed position.

Figure 4:
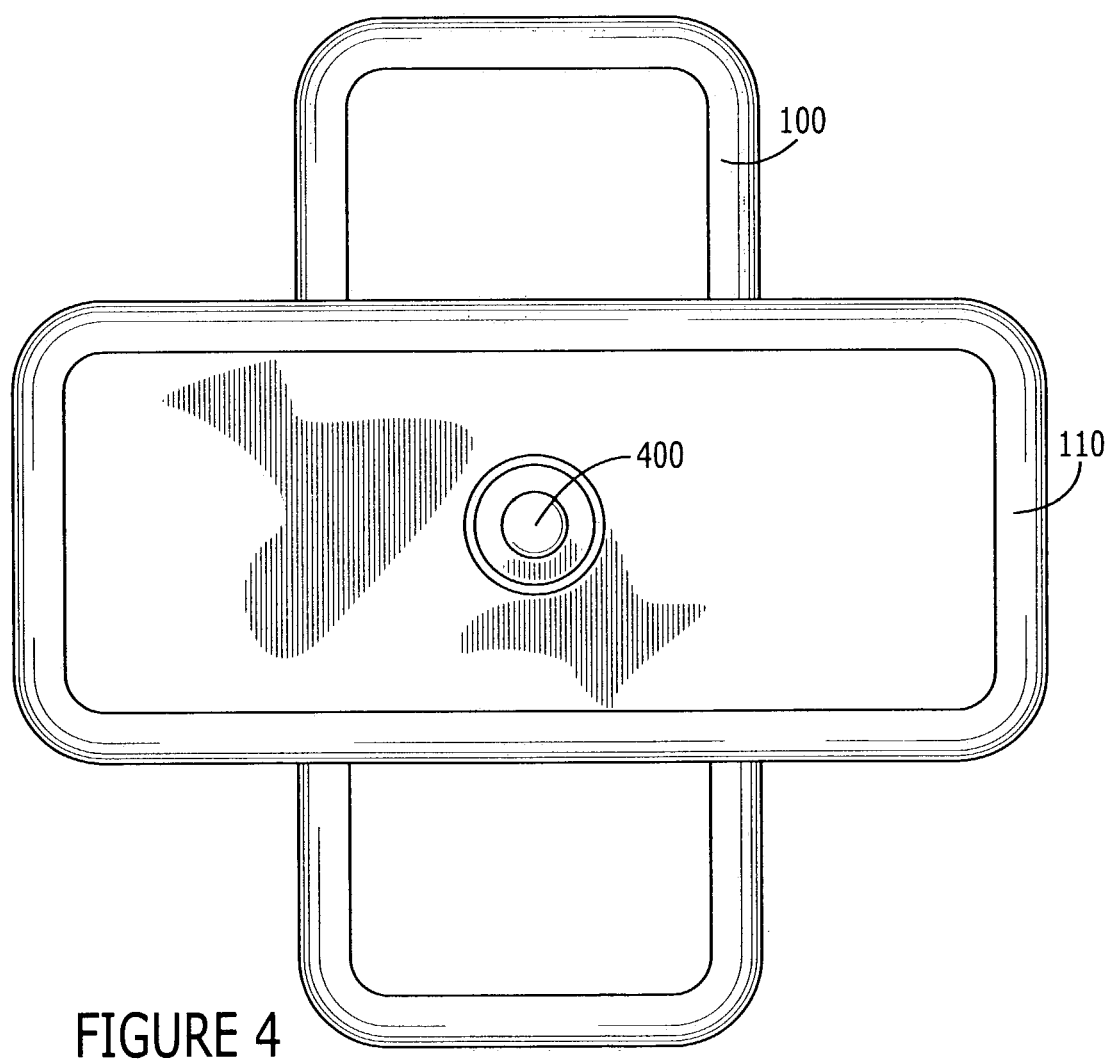
FIG. 4 illustrates a back view of a mobile computing device in accordance with various embodiments of the present invention.

FIG. 4 illustrates a back view of the mobile computing device with the interface housing 110 rotationally coupled to the main housing 100 by a rotational coupler 400. As will be appreciated, the main housing 100 and the interface housing 110 may be configured so that the interface housing 110 does not extend as shown in FIG. 1 symmetrically beyond opposite sides of the main housing 100 when deployed, and may be configured so that the interface housing 110 extends beyond one or both ends of the main housing 100 when the interface housing 100 is in the closed position.

Figure 3A:
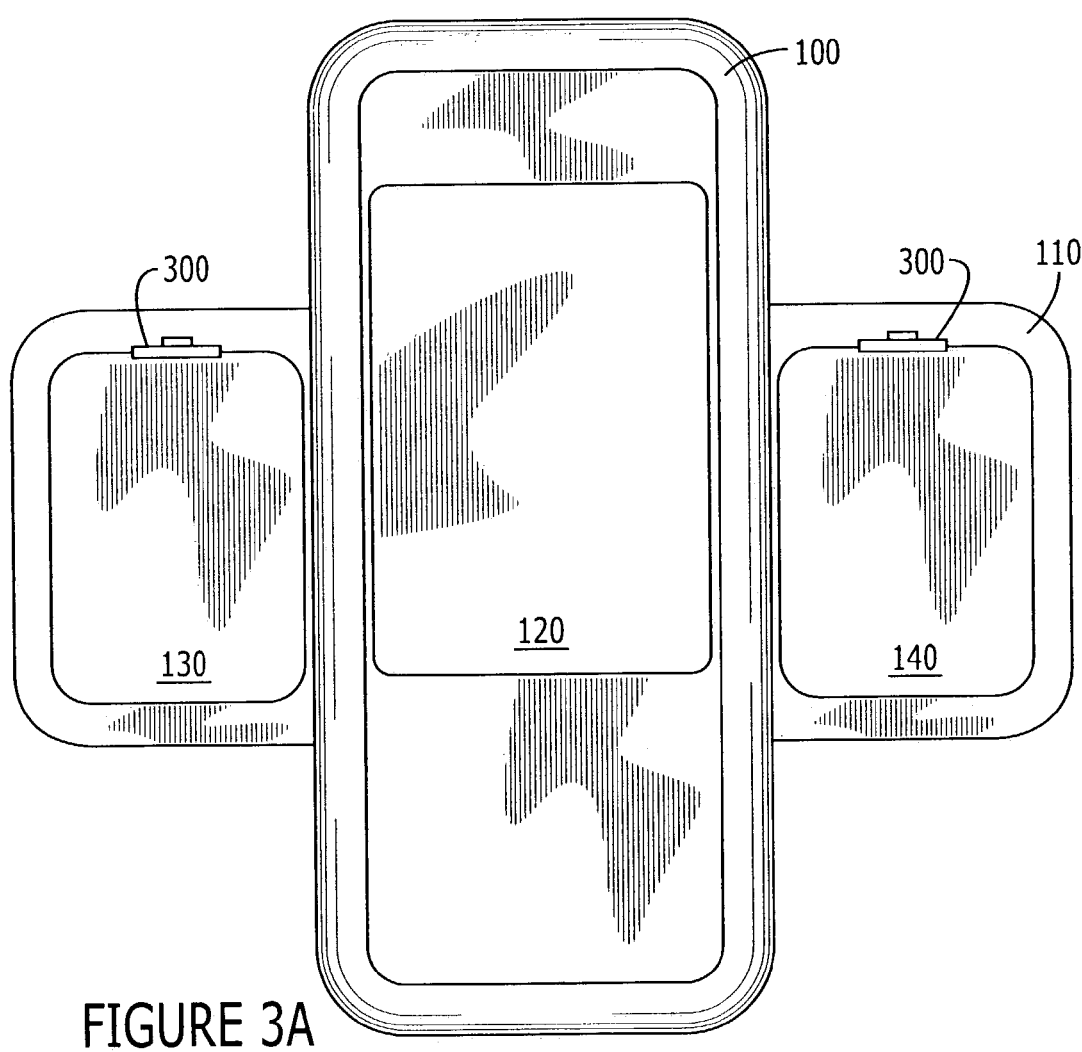
FIG. 3A–B illustrates a mobile computing device with interchangeable user interface devices in accordance with various embodiments of the present invention.
Figure 3B:
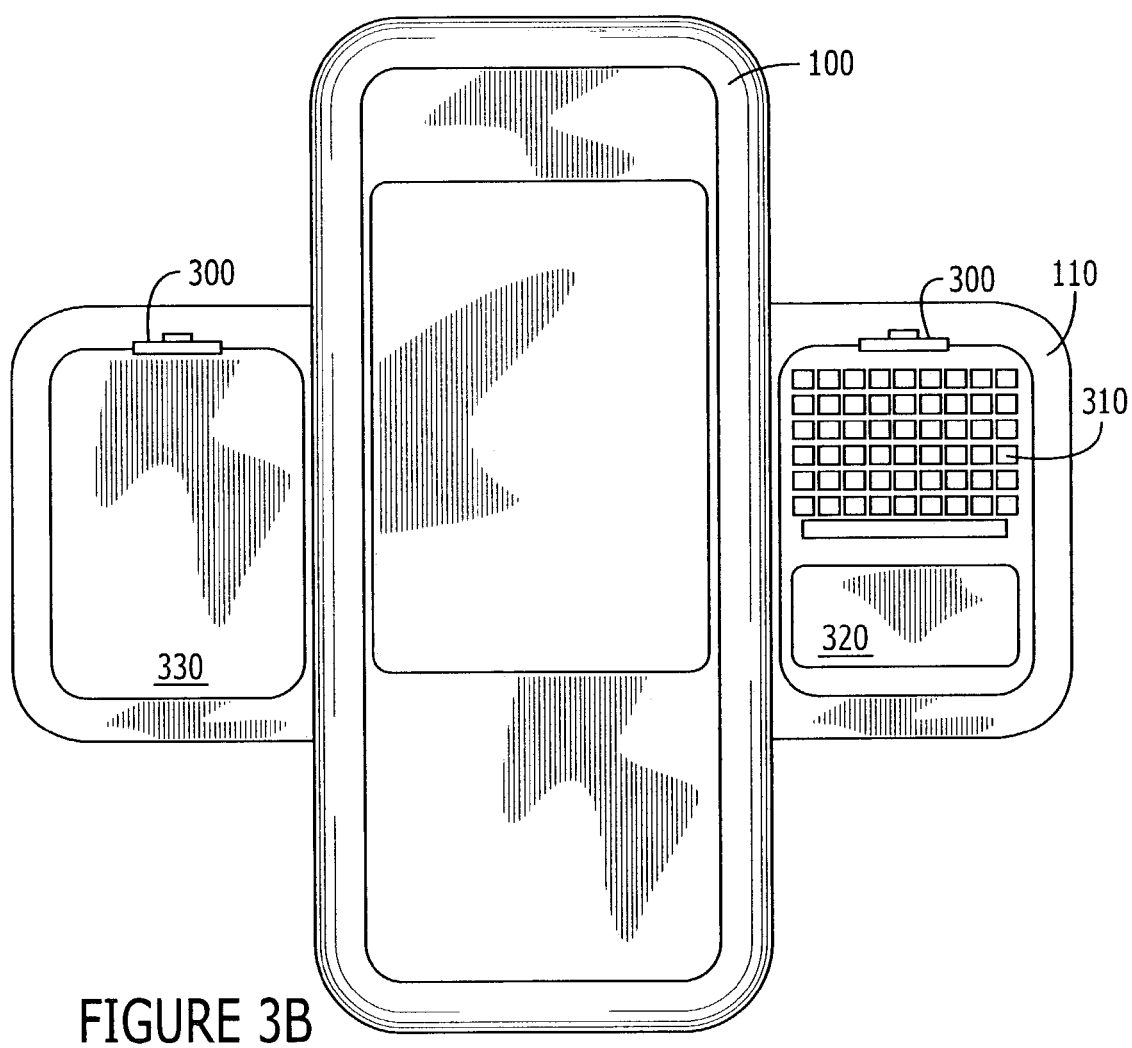

One or both of the interface devices 130 and 140 may be releaseably connected to the interface housing 110. For example, as illustrated in FIG. 3A, the interface housing 110 may include latches 300 that each engage a surface of a corresponding interface device 130 and 140 to retain the interface device. Referring to FIG. 3B, interface devices may be removed and replaced by other interface devices. For example, a keyboard 310 and touch sensitive pad 320 on the right side of the deployed interface housing 110 may be swapped with a speaker 330 on the left side by, for example, manipulating the latches 300. The interface devices 130 and 140 may both be speakers, which may provide improved stereo sound to a user due to their spatial separation. The interface devices 130 and 140 may be user input devices, such as a keyboard or touch sensitive pad, which may be simultaneously manipulated by both hands of a user during, for example, gaming and/or data input.

Figure 5:
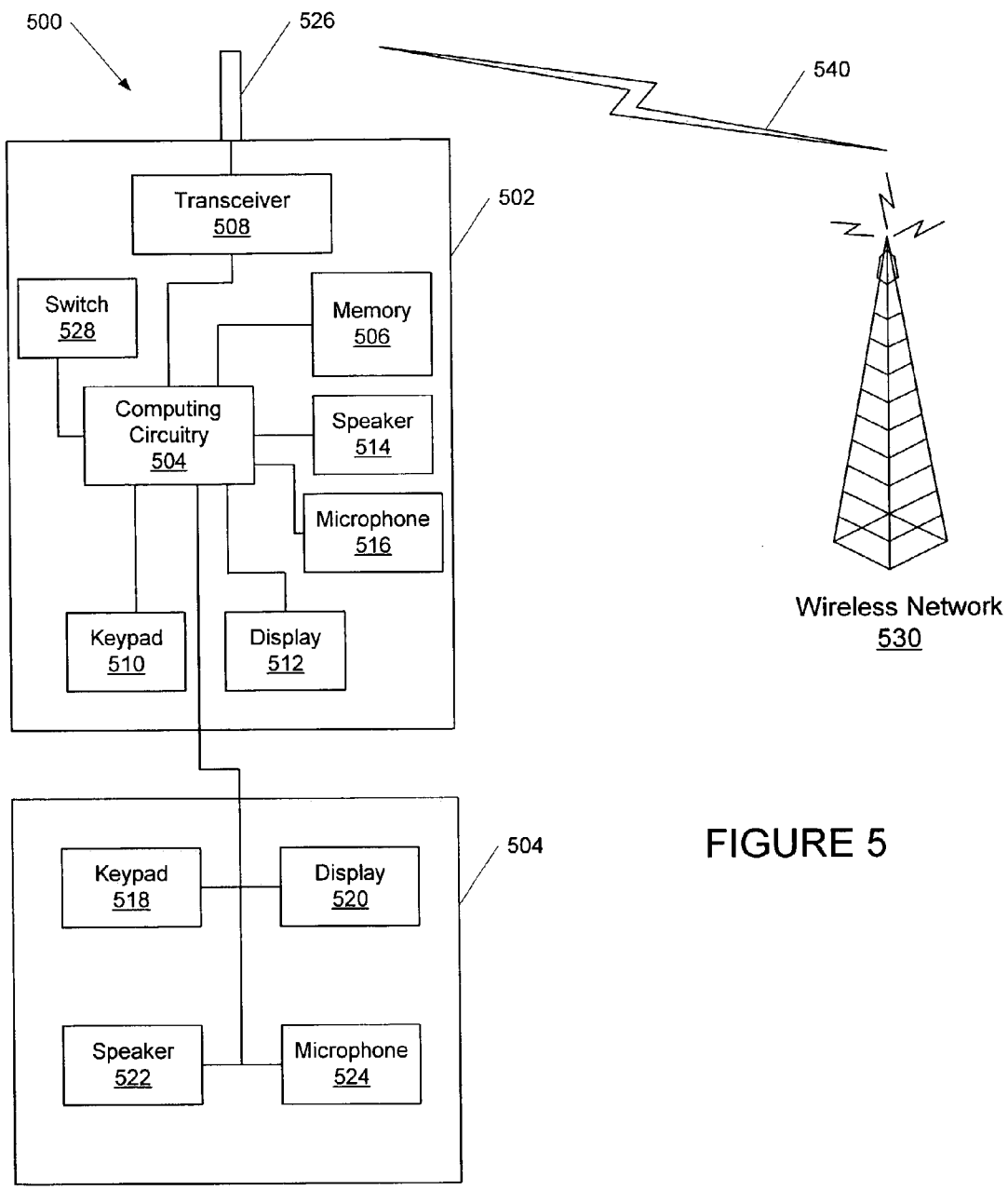
FIG. 5 is a block diagram that illustrates a wireless mobile terminal in a wireless communication system in accordance with various embodiments of the present invention.

FIG. 5 is a functional block diagram that shows a mobile computing device that is a mobile terminal 500 that may be used in a wireless communication system. The mobile terminal 500 includes a main housing 502 and an interface housing 504. The mobile terminal 500 may further include computing circuitry 504, a memory 506, a transceiver 508, a keyboard/keypad 510, a display 512, a speaker 514, and/or a microphone 516 that are at least partially disposed within the main housing 502. The mobile terminal 500 may further include a keyboard/keypad 518, a display 520, a speaker 522, and/or a microphone 524 that are at least partially disposed within the interface housing 504.

The memory 506 may include one or more erasable programmable read-only memories (EPROM or Flash EPROM), battery backed random access memory (RAM), magnetic, optical, or other digital storage device, and may be separate from, or at least partially within, the computing circuitry 504. The transceiver 508 typically includes both a transmitter and a receiver to allow two way communications, but the present invention is not limited to such devices and, as used herein, a "transceiver" may include both a receiver and a transmitter or only one such communication circuit. The mobile terminal 500 may, thereby, communicate with a wireless communications network 530 using radio frequency signals. The radio frequency signals may be communicated through an antenna 526 over at least one communication channel 540 with the wireless communications network 530. The antenna 526 may be connected to, or at least partially enclosed within, the main housing 502, for example as shown in FIG. 5, and/or may be at least partially enclosed within the interface housing 504.

The computing circuitry 504 may support various communication and application related functions of the mobile terminal 500 that may be defined by software in the memory 506. Operating according to the software, the computing circuitry 504 formats communication signals for transmission over the communication channel 540 according to a wireless communication protocol. The wireless communication protocol may include operations for establishing the communication channel 540 as a communication connection with the wireless network 530, maintaining the communication connection, formatting voice (speech) signals from the microphones 516 and/or 524 to digital communication signals that are suitable for transmission over the communication channel 540 (i.e., voice coding), and/or formatting voice signals that are received over the communication channel 540 to a form suitable for output by the speakers 514 and/or 522 (i.e., voice decoding). The formatted communication signals may include both traffic (voice and/or data) and control signals (e.g., paging signals/messages for incoming calls). Examples of wireless communication protocols that the mobile terminal 500 may provide include ANSI-136, GSM, code division multiple access (CDMA), wideband-CDMA, CDMA2000, Enhanced Data rates for GSM Evolution (EDGE), Universal Mobile Telecommunications System (UMTS), BLUETOOTH protocol, and wireless local area network (WLAN) protocols, including IEEE 802.11b. and the like. These and other wireless communication protocols are well known to those of skill in the art and will not be further described herein.

The computing circuitry 504 and software in the memory 506 may also provide application related functions that may include providing games to a user, playing music (e.g., mp3 or other encoded music that may be received from the wireless network 530 or otherwise provided in, for example, the memory 506), generating/sending/receiving short message service messages, emails, data, digital pictures, and/or video. The computing circuitry 504 may also be configured to operate in alternative modes, such as, for example, a wireless communication mode in which the mobile terminal 500 may communicate with the wireless network 530 and a game mode, in which the mobile terminal 500 provides games to a user. Other modes may include a voice communication mode, an internet communication mode, and a music mode. The alternative modes may be mutually exclusive such, for example, only one mode at a time is allowed. The processing capability of the computing circuitry 504 may be reduced by making the modes mutually exclusive.

The mobile terminal 500 may further include a switch 528 that may be used to provide an indication of the position of the main housing 502 relative to the interface housing 504. For example, the switch 528 may sense when the interface housing 504 is in the closed position and/or when it is in the deployed position, and/or it may indicate when the housings 502 and 504 are in a position therebetween. The computing circuitry 504 may then be configured to selectably enable (i.e. use) or disable (i.e. not use) one or more of the user interfaces 518, 520, 522, and 524 and/or may switch modes based on the indication from the switch 528. For example, when the interface housing 504 is in a closed position, the mobile terminal 500 may be in the wireless communication mode, and when the second interface housing 504 is rotated to a deployed position, the mobile terminal 500 may automatically provide the game mode, voice communication mode, internet communication mode, and/or the music mode.

The user interfaces 518, 520, 522, 524, 510, 512, 514, and/or 516 in the housings 502 and 504 may be enabled and/or disabled based on the relative positions of the housings 502 and 504, as may be sensed, for example, by the switch 528. For example, when the interface housing 504 is in a closed position, where the user interfaces 518, 520, 522, and/or 524 may be at least partially covered by the main housing 502, one or more of the user interfaces may be disabled from use. Similarly, for example, when the interface housing 504 is in a deployed position, Such that the user interfaces 518, 520, 522, and/or 524 may be at least partially uncovered from the main housing 502, one or more of the user interfaces may be enabled for use.

In the drawings and specification, there have been disclosed typical embodiments of the invention and, although specific terms are employed, they are used in a generic and descriptive sense only and not for purposes of limitation, the scope of the invention being set forth in the following claims.

The invention claimed is:

1. A mobile computing device comprising:
   a first housing;
   computing circuitry within the first housing;
   a display that is configured to visually display information from the computing circuitry to a user, wherein the display is at least partially disposed within the first housing;
   a second housing that is rotationally coupled to the first housing through an intermediate region of each of the first and second housings;
   a first user interface device that is at least partially disposed within the second housing;
   a second user interface device that is at least partially disposed within the second housing on an opposite side of the intermediate region of the second housing from the first user interface device, and wherein the second housing is configured to be rotated relative to the first housing between a closed position in which the first and second user interface devices are at least partially covered by the first housing and a deployed position in which the first and second user interface devices are at least partially uncovered on opposite lateral sides of the first housing from one another, wherein the computing circuitry is configured to format information according to a wireless communication protocol for communication with a wireless communications network;
   a switch that is configured to sense whether the second housing is in the closed position relative to the first housing or in the deployed position relative to the first housing and to generate an indication of the sensed position; and
   a speaker in the first housing, and wherein at least one of the first and second user interface devices in the second housing comprises a speaker, and wherein the computing circuitry is further configured to operate in a music mode in which music data from the wireless communications network is selectively provided to the speaker in the first housing responsive to the switch indicating that the second housing is in the closed position and to provide the music data to the at least one speaker in the second housing responsive to the switch indicating that the second housing is in the deployed position.

2. The mobile computing device of claim 1, wherein the first housing is configured to cover an entire front surface of at least one of the first and second user interface devices in the closed position.

3. The mobile computing device of claim 2, wherein at least one of the first and second user interface devices are completely uncovered when the second housing is rotated to the deployed position.

4. The mobile computing device of claim 1, wherein at least one of the first and second user interface devices comprises a user input device that is configured to provide user input data to the computing circuitry.

5. The mobile computing device of claim 4, wherein the user input device comprises a keyboard.

6. The mobile computing device of claim 4, wherein the user input device comprises a touch sensitive pad.

7. The mobile computing device of claim 1, wherein at least one of the first and second user interface devices comprises a user input device that is enabled responsive to the switch indicating that the second housing is in the deployed position and is disabled responsive to the switch indicating that the second housing is in the closed position.

8. The mobile computing device of claim 1, wherein the display is configured to display information from the computing circuitry for establishing a wireless connection with the wireless communications network.

9. The mobile computing device of claim 1, wherein the computing circuitry is further configured to operate in a wireless communication mode and a game mode, and is further configured to change between the wireless communication mode and the game mode responsive to the indication from the switch.

10. The mobile computing device of claim 1, wherein the computing circuitry is further configured to operate in a voice communication mode and an internet communication mode, and is further configured to change between the voice communication mode and the internet communication mode responsive to the indication of the sensed position from the switch.

11. The mobile computing device of claim 1, wherein at least one of the first and second user interface devices is releaseably connected to the second housing.

12. The mobile computing device of claim 1, wherein in the deployed position opposite ends of the second housing each extend a first distance away from the opposite lateral sides of the first housing.

13. The mobile computing device of claim 1, wherein in the deployed position the first and second user interface devices are completely uncovered and are symmetrical relative to the opposite lateral sides of the first housing.

14. The mobile computing device of claim 1, wherein:
   the second housing is rotationally coupled to the first housing through a central region of each of the first and second housings; and
   the second user interface device is at least partially disposed within the second housing on an opposite side of the central region of the second housing from the first user interface device.

* * * * *